UNITED STATES PATENT OFFICE 2,388,764

CELLULOSE ETHERS AND PROCESS FOR PRODUCING THE SAME

Frank H. Reichel and Ralph T. K. Cornwell, Fredericksburg, Va., assignors to Sylvania Industrial Corporation, Fredericksburg, Va., a corporation of Virginia No Drawing. Application May 27, 1942, Serial No. 444,718. In Great Britain October 20, 1938

6 Claims. (Cl. 260—232)

The invention relates to alkali-soluble cellulose ethers and has for its general object the production of cellulose ethers which are insoluble in water but which are soluble at 0° C. in aqueous alkali solutions of 3% or less alkali concentration. This application is a continuation-in-part of our co-pending U. S. application Serial No. 300,176 filed October 19, 1939.

It is known to produce cellulose ethers which are soluble at 0° C. in 5% to 10% aqueous solutions of sodium hydroxide. However, such high alkali concentrations are objectionable in finishing textiles made of wool, silk or viscose rayon because the alkali causes a harmful swelling of the material and prevents the rapid penetration of the cellulose ether into the material. Moreover, such known cellulose ethers cannot be used for finishing paper because it is impossible to maintain the alkali concentration in the paper pulp so that the ether is precipitated by dilution. Attempts to dilute such alkali solutions of the known alkali-soluble cellulose ethers by adding water to give solutions of less than 3% alkali concentration have been unsuccessful because the diluted solutions tend to form a gel which has little utility. The necessity of using a solvent containing from 5% to 10% alkali for dissolving such prior ethers limits their use in printing and pad-dyeing because there are many pigments and dyestuffs which are not stable in such strong alkali solutions.

Moreover, by the known methods of producing alkali-soluble cellulose ethers, the substitution of the ether groups in the cellulose was never sufficiently uniform so that it frequently happened that the product was only partly soluble even in 5% to 10% aqueous sodium hydroxide solutions at 0° C. For example, in U. S. Patent No. 1,863,208 at p. 7 lines 57 to 64, there is disclosed a cellulose ether containing 20% added ethylene content, but by reference to Fig. 1 of said patent it is shown that less than 30% of this cellulose ether will dissolve in alkali of 2½ to 3% caustic soda solution. The low solubility of this prior cellulose ether, despite the high ratio of ether groups to cellulose (about 1.5 to 1) is due to the nonuniformity of the etherification and the improper ratio of ether groups to cellulose.

Accordingly, it is a general object of the present invention to provide a new series of cellulose ethers which will be insoluble in water but soluble at 0° C. in aqueous alkali solutions of 3% or less alkali concentration.

Another object is to carry out the etherification reaction in a more uniform and economical manner so that the product will have a uniform and substantially complete solubility in such alkali solutions at 0° C.

A further object is to provide an alkali-soluble, water-insoluble cellulose ether which can be used in printing, pad-dyeing and finishing wool, silk, rayon and paper all of which materials are affected by alkali solutions of greater than 3% alkali concentration.

In the practice of the present invention it has been discovered that a new series of cellulose ethers can be produced which are substantially completely soluble in aqueous solutions of 3% or less alkali concentrations by carrying out the etherifying reaction while the cellulosic starting material is uniformly dispersed, that is, uniformly suspended or dissolved in an aqueous alkaline solution, as a result of which the etherification is substantially uniform and the yield is greater.

In the now preferred embodiment of the present invention the process comprises forming a uniform dispersion of a low-etherified cellulose ether, in an alkaline liquid selected from the class consisting of aqueous solutions of alkali metal hydroxides and organic nitrogen bases, adding to the liquid phase of the dispersion a compound selected from the class consisting of alkylating, hydroxyalkylating, and carboxy-alkylating agents controlling the temperature of the dispersion so that it does not rise above 70° C., continuing the alkylation until there is produced a cellulose ether having at least .05 ether group for each cellulose unit and discontinuing the reaction before the cellulose ether becomes soluble in water. Thus by the present invention there is produced a new series of cellulose ethers which are characterized by having not less than .05 ether group for each unit of cellulose ($C_6H_{10}O_5$) and by being insoluble in water but soluble at 0° C. in aqueous solutions of sodium hydroxide having a concentration of from 0.5 to 3% alkali; the solutions of said ether in more concentrated alkali solutions being capable of dilution without gelling.

In the present invention the new cellulose ethers are produced from low-etherified alkali-soluble water-insoluble cellulose ethers. For the production of such starting material there may be used cellulose in any of its natural forms and cellulose conversion products, such as oxycellulose, hydrocellulose and cellulose hydrates of all kinds. It is preferable but not necessary that the cellulose be converted to alkali cellulose which may be done in a known manner. It is also unnecessary for the cellulose to be mercerized before etherification. The cellulose or alkali cellulose is first converted into a low-etherified cellulose ether soluble in 5% to 10% alkali solutions in a known manner which either is thereafter converted into the new cellulose ethers as herein described. The low-etherified cellulose ether may be an alkyl ether, a hydroxy-alkyl ether, a carboxy-alkyl ether or a mixed cellulose ether.

For the alkylating agent there may be employed the alkyl esters of inorganic acids, for example, dimethyl sulphate, di-ethyl sulphate, methyl sodium sulphate and the like, and alkyl halides, e. g. methyl chloride, ethyl chloride, methyl bromide, ethyl bromide and the like; as hydroxy-alkylating agents, the alkylene oxides, e. g. ethylene oxide, propylene oxide, glycides and the like, and halohydrins such as ethylene chlorhydrin, propylene chlorhydrin, glycerine chlorhydrin, epichlorhydrin and the like, and as carboxy-alkylating agents, chloroacetic acid, chloropropionic acid, sodium chloroacetate, chloroacetamide and the like. The expression "cellulose ether" is intended to include simple alkyl ethers, hydroxy-alkyl ethers, carboxy-alkyl ethers, mixed alkyl hydroxy-alkyl ethers, mixed alkyl carboxy-alkyl ethers, and the salts of the carboxy-alkyl ethers.

The etherifying reaction is preferably carried out with both the low etherified cellulose ether and the alkylating agent uniformly dispersed in an alkaline medium for which there may be employed strong inorganic or organic alkalis, such as lithium, sodium and potassium hydroxides, and strong organic nitrogen bases, for example suitable quaternary substituted ammonium bases, such as quaternary alkyl-aralkyl ammonium hydroxide, an example of which is trimethyl benzyl ammonium hydroxide; quaternary alkyl ammonium hydroxide, an example of which is tetra n-propyl ammonium hydroxide; and quaternary aralkyl ammonium hydroxide, an example of which is tetra benzyl ammonium hydroxide. Further examples of suitable quaternary ammonium bases are dimethyl dibenzyl ammonium hydroxide, trimethyl phenylmethyl ammonium hydroxide, trimethyl cresyl ammonium hydroxide, tetramethyl ammonium hydroxide, triethyl benzyl ammonium hydroxide, tetra isopropyl ammonium hydroxide, cyclo butyl trimethyl ammonium hydroxide, etc. Also any amine which is strongly basic in aqueous solution may be employed as, mono and di-methyl amine, ethylamine, aniline, pyridine, ethylene diamine and the like. The concentration of alkali should not be above 25%, preferably 5% to 10% of the solution.

It is to be understood that in the present invention the aqueous alkaline medium serves two important functions, namely, as a liquid solvent or dispersion medium for the low etherified cellulose ether and for the alkylating agent, and the alkali compound in said medium serves as a condensing agent or catalyst for the reaction. It has been found that the etherification proceeds in a more regular and controllable manner and that a more uniform product is produced if the reaction is carried out in a liquid phase. Preferably the low etherified cellulose ether is dissolved in the aqueous alkaline medium, and etherified by addition of the alkylating agent to the solution. The alkylating agent is preferably also in a liquid condition or in solution in an aqueous liquid. The ideal conditions for uniform etherification are found when the alkaline medium is such that the low etherified cellulose ether actually dissolves or forms a colloidal solution therein. For example, the quaternary ammonium bases will dissolve the low etherified cellulose ethers; and aqueous solutions of the alkali metal hydroxides also dissolve them. Thus anyone skilled in the art can select an appropriate alkaline medium as a solvent for any of the low etherified cellulose ethers. However, it is not essential that a solution of the said ethers be formed since a uniform and rapid reaction occurs when the ether is comminuted and uniformly suspended in a large volume of the liquid alkaline medium. The expression "liquid dispersion" as used in the specification and claims is intended to include solutions, colloidal dispersions and suspensions of the reactants in the alkaline medium.

It is desirable to add the alkylating agent in small quantities over a period of several hours with constant stirring while allowing the temperature to increase gradually to not more than about 10° per hour and preventing the temperature from rising at any time above about 70° C., the etherifying treatment being carried out with or without pressure. When the alkylating agent is volatile or gaseous the reaction is carried out in a closed vessel. The extent of reaction may be followed by taking samples from time to time, precipitating the cellulose ether by pouring it into a warm 10% aqueous sulphuric acid solution, washing the product free of salts, and then testing the solubility in a 3% aqueous solution of sodium hydroxide at 0° C. The reaction may be continued until the product is soluble in aqueous solutions of sodium hydroxide of any desired concentration from 3% down to 0.5% at 0° C. However, it is preferred to stop the reaction when or before the ether produced becomes substantially soluble in water or in alkali of less than 0.5% concentration. The cellulose ether, i. e. the reaction product is treated with any coagulant suitable for coagulating viscose such, for example, as a mineral acid or an acid gas, hot water, or a hot solution of a salt or acid salt, to precipitate the cellulose ether. The precipitated ether is washed and dried in a known manner.

It should be understood that the solubility characteristics of the cellulose ether produced will depend, inter alia, upon the nature of the low etherified cellulose ether employed, and/or the degree of degradation of the cellulose unit at the time of treatment, and/or the period of the reaction and/or the temperature at which the reaction is conducted and/or the nature and proportions of the alkylating agents used in the process, and other factors well known to those skilled in the art. Generally speaking, less hydroxyl-alkyl or carboxy-alkyl groups are required than of alkyl groups to produce an ether soluble in a given concentration of alkali at the same temperature. Following the principles of the invention, the new cellulose ethers may be produced by introducing into the cellulosic material not less than about 0.05 ether group for each unit of cellulose ($C_6H_{10}O_5$).

By way of illustrating, but not by way of limiting the invention, there will be given the following specific example:

*Example.*—A suitable starting material is obtained by preparing an alkali-soluble hydroxyalkyl cellulose ether as follows: To 100 grams of comminuted wood pulp there is added 1000 parts of an 18% aqueous solution of sodium hydroxide, at room temperature, the pulp being steeped therein for 12 hours. The mass is pressed to three times the original weight, placed in a closed vessel and treated with 20% by weight of ethylene chlorhydrin for a period of 3 hours at 20° C., the reaction mixture being allowed to age for 20 hours at 20° C. The hydroxy-ethyl cellulose ether is washed until free of alkali and sodium chloride, and dried in a known manner. The cellulose ether produced contains 1.66% hydroxy-ethyl or .06 hydroxy-ethyl groups to one cellulose unit ($C_6H_{10}O_5$), and is soluble in an 8% aqueous solution of sodium hydroxide at 15° C.

Eight grams of the cellulose ether thus produced is dissolved in 100 grams of 8% aqueous sodium hydroxide solution at 15° C. and there is added to the solution 35% of diethyl sulphate (calculated on the weight of the dry cellulose ether). The di-ethyl sulphate is added slowly and with continuous stirring over a period of about 5 hours, during which time the temperature is controlled so that it is 30° C. at the end of the third hour, 40° C. at the end of the fourth hour and 60° C. at the end of the fifth hour, the reaction being substantially complete at the end of the fifth hour. The reaction product is poured into a warm 10% aqueous solution of sulphuric acid and the precipitated cellulose ether washed with warm water until free of alkali and salt, and then dried in a current of warm dry air. The product is a mixed cellulose ether containing 1.66% hydroxyethyl and 2.01% ethyl or 0.15 total mixed ether group per unit of cellulose ($C_6H_{10}O_5$). The product is soluble in 2% aqueous solution of sodium hydroxide at 0° without residue, but is insoluble in hot or cold water or in organic solvents.

Following the example given above, it is possible to prepare a series of cellulose ethers which are soluble in aqueous solutions of sodium hydroxide having a concentration varying from 3% down to 0.5% or less, but insoluble in water or organic solvents. For example, using as a starting material a solution of 8 parts of the particular hydroxyalkyl cellulose ether employed in the example dissolved in 100 parts of 8% aqueous hydroxide solution, there is given in the following table the solubility characteristics of the products produced with varying quantities of diethyl sulphate.

| Parts of di-ethyl sulphate per 100 parts of ether treated | Concentrations of aqueous NaOH solutions which will dissolve the product at 0° C. |
| --- | --- |
|  | Percent |
| 10 | 3 |
| 25 | 2 |
| 35 | 2 |
| 50 | 1 |
| 75 | 0.75 |
| 100 | 0.5 |
| 125 | 0.5 |

When more than 125 parts of di-ethyl sulphate are used in treating this particular hydroxy-ethyl cellulose, the product tends to be soluble in water. Thus, it appears that the new cellulose ethers of the present invention lie between the class of alkali-soluble cellulose ethers heretofore known and the known water-soluble cellulose ethers.

The ethers need not be recovered from the reaction mixture which may be diluted with water to given an alkali concentration of 3% or less. However, the ether may be recovered and, with or without drying, dissolved directly in alkali of 3% or less concentration or first dissolved in more concentrated alkali solutions and then diluted down to 3% or less alkali. Such dilution can be accomplished without the solution gelling, in contrast with the solutions of cellulose ethers heretofore known.

Many important advantages arise from carrying out the etherification while the reagents are uniformly dispersed in a liquid phase. In the first place, the low etherified cellulose ether will be uniformly wetted or in uniform contact with the alkali and with the alkylating agent so that the substitution of ether groups is able to take place uniformly along the cellulose chain, whereby the number of low etherified and of high etherified cellulose chains that deviate from the average is greatly diminished as compared with ethers produced by alkylating the cellulosic material when not so dispersed in liquid. Further, in the liquid phase the velocity of the reaction and the speed of propagation of the reaction zone is substantially greater than when an alkali-moist solid cellulosic material is etherified. Finally, since in the dispersion (or solution) the low etherified cellulose ether is finely divided or dissolved the surface of contact with the alkylating agent is greater so that the reaction is rapid but uniform, thus enabling the extent of substitution to be easily controlled.

Among the uses to which the new series of ethers may be put are the following:

(a) The preparation of artificial structures of all kinds, such, for example, as films, filaments, bands, tubing, capsules, artificial straw, staple fibre and plastic masses.

(b) As adhesive, glue substitutes, for example in laminating fabrics, leather, metal foil and paper to the same or to other materials, and for making stiffened textiles. Owing to the low concentration of the alkali, the adhesive will not produce a harmful swelling or solution of such materials.

(c) As finishes, coatings, dressings, and sizings of all kinds, in particular sizings for textiles formed of or comprising wool, silk, leather or other protein materials, and rayon or staple fibre made from viscose or a cellulose ester. The low alkali concentration permits a rapid penetration into such materials because the alkali does not swell the textiles. The solutions of the present invention exhibit a substantial lowering of the viscosity with increase in temperature, so that if textiles coated with the present solutions are heated or partially dried before coagulation of the cellulose ether, the penetration is increased.

(d) As sizings, fillings and finishes for paper. The present cellulose ethers will remain in solution when admixed with a paper pulp and may be precipitated in and on the paper fibres by use of suitable coagulants.

(e) As dispersing and thickening agents for pigments and dyes for use in printing and pad-dyeing textiles, paper, and the like. Since the new cellulose ethers herein provided dissolve in aqueous caustic alkali solutions containing less than 3% alkali and as little as 0.5% alkali, they permit the use of a wide variety of pigments and dye-stuffs which are unstable in more concentrated caustic alkali solutions. Moreover since the alkali solutions of the present ethers do not gel when diluted their use permits one to ship the printing pastes in concentrated form and then diluted when mixed or used, thus effecting an economy in shipping.

Owing to the low concentration of alkali in which they may be dissolved, the new cellulose ethers alone or in aqueous solution are compatible with numerous colloids such, for example, as viscose, cuprammonium solutions and solutions of cellulose in various organic and inorganic solvents (if such solvents are not coagulants); latex and aqueous artificial rubber dispersions; gums; natural and synthetic resins; casein; gelatine; glue; water-soluble cellulose ethers and other hydrophilic colloids; waxes; fats, and mineral and vegetable oils.

Since certain changes in carrying out the above process, and certain modifications in the product which embodies the invention may be made without departing from its scope, it is intended that all matter contained in the above description shall be interpreted as illustrative and not in a limiting sense.

We claim:

1. A process for making cellulose ethers, which comprises dissolving a low etherified hydroxy-alkyl ether containing about 0.06 hydroxy-alkyl group per cellulose unit ($C_6H_{10}O_5$) in aqueous sodium hydroxide solution at a temperature of about 15° C. and of 5 to 10% concentration, adding diethyl sulfate slowly thereto with gradual rise in temperature but control thereof so that it does not exceed 70° C., continuing the reaction until a cellulose ether is produced having about 0.15 ether group per unit of cellulose, being soluble at 0° C. in an aqueous solution of sodium hydroxide having a concentration of about 2% but insoluble in water, and thereafter discontinuing the reaction.

2. A process for making cellulose ethers, which comprises dissolving a low etherified hydroxy-alkyl ether containing about 0.06 hydroxy-alkyl group per cellulose unit ($C_6H_{10}O_5$) in an aqueous solution of a strongly basic hydroxide at about 15° C. and of 5 to 10% concentration, adding to said dispersion a compound selected from the class consisting of alkylating, hydroxy-alkylating, and carboxy-alkylating agents slowly in small quantities over a period of hours with constant stirring and gradual increase in temperature of not more than about 10° C. per hour, while controlling the temperature so that it does not rise above 70° C., maintaining such conditions for a period sufficient to form a cellulose ether having about 0.15 ether group per unit of cellulose, being soluble at 0° C. in an aqueous solution of sodium hydroxide having a concentration of about 2% but insoluble in water, and then discontinuing the reaction.

3. A process for making cellulose ethers, which comprises dissolving a low etherified hydroxy-alkyl ether containing about 0.06 hydroxy-alkyl group per cellulose unit ($C_6H_{10}O_5$) in an aqueous solution of a strongly basic hydroxide at a temperature of about 15° C. and of 5 to 10% concentration, adding an alkyl sulfate slowly thereto with gradual rise in temperature but control thereof so that it does not exceed 70° C., continuing the reaction until a cellulose ether is produced having about 0.15 ether group per unit of cellulose, being soluble at 0° C. in an aqueous solution of sodium hydroxide having a concentration of about 2% but insoluble in water, and thereafter discontinuing the reaction.

4. A process for making cellulose ethers, which comprises dissolving a low etherified cellulose ether containing substantially less than 0.15 ether groups per cellulose unit ($C_6H_{10}O_5$) selected from the group consisting of alkyl, hydroxy-alkyl, and carboxy-alkyl ethers in an aqueous solution of a strongly basic hydroxide at a temperature of about 15° C. and of 5 to 10% concentration, adding a compound selected from the class consisting of alkylating, hydroxy-alkylating, and carboxy-alkylating agents slowly thereto with gradual rise in temperature but control thereof so that it does not exceed 70° C., continuing the reaction until a cellulose ether is produced having about 0.15 ether group per unit of cellulose, being soluble at 0° C. in an aqueous solution of sodium hydroxide having a concentration of about 2% but insoluble in water, and thereafter discontinuing the reaction.

5. A process for making cellulose ethers, which comprises dissolving a low etherified cellulose ether containing substantially less than 0.05 ether group per cellulose unit ($C_6H_{10}O_5$) selected from the group consisting of alkyl, hydroxy-alkyl, and carboxy-alkyl ethers in an aqueous solution of a strongly basic hydroxide at a temperature of about 15° C. and of 5 to 10% concentration, adding a compound selected from the class consisting of alkylating, hydroxy-alkylating, and carboxy-alkylating agents slowly thereto with gradual rise in temperature but control thereof so that it does not exceed 70° C., maintaining such condition for a period sufficient to form a cellulose ether having at least 0.05 ether group for each cellulose unit ($C_6H_{10}O_5$) and being soluble at 0° C. in aqueous sodium hydroxide solution having a concentration of about 0.5 to about 3% but insoluble in water, and then discontinuing the reaction.

6. As a composition of matter a mixed alkyl hydroxy-alkyl ether of cellulose characterized by having about 0.15 ether group per unit of cellulose ($C_6H_{10}O_5$), by being soluble at 0° C. in aqueous solutions of sodium hydroxide of about 2% concentration but insoluble in water and organic solvents, and obtainable by the process of claim 1.

FRANK H. REICHEL.
RALPH T. K. CORNWELL.